UNITED STATES PATENT OFFICE.

JOSEPH H. WEEKS, OF RUTLEDGE, PENNSYLVANIA, ASSIGNOR TO JACKSON S. WEEKS, OF DELAWARE COUNTY, PENNSYLVANIA, AND RAYMOND M. WEEKS, OF PHILADELPHIA, PENNSYLVANIA, TRUSTEES.

COMPOSITION FOR ELECTROLYTES FOR ELECTRICAL ETCHING.

1,314,840.  Specification of Letters Patent.  Patented Sept. 2, 1919.

No Drawing.  Application filed April 30, 1917. Serial No. 165,474.

*To all whom it may concern:*

Be it known that I, JOSEPH H. WEEKS, a citizen of the United States, residing at Rutledge, in the county of Delaware and State of Pennsylvania, have invented certain new and useful Improvements in Composition for Electrolytes for Electrical Etching, of which the following is a specification.

My invention has for its object the production of an improved electrolyte for use in electrical etching of metals.

The general subject matter to which this invention relates is discussed in my prior applications, Serial Numbers 88,362, 108,232, and 119,548, filed respectively April 1, 1916, July 8, 1916, and September 11, 1916. In the first of said applications, I have disclosed a method, apparatus, and certain compositions for electrolytes intended to be used therein; in the second application, I have described and claimed a process and composition, and in the third application, I have described and claimed certain improved apparatus. The electrolyte which I shall hereinafter set forth is adapted for use in the aforesaid processes, and with the aforesaid apparatus, although it is not necessarily limited thereto, and may be employed in other connections, and for other metals or alloys of metals than those therein specifically described.

In the prior applications referred to, I have set forth a method of etching plates in which a resistant image is produced on a plate, either by means of ink or powder, which is well known in the art, or by means of a special gelatin-albumen enamel of my own invention. The plate so prepared is suspended in a suitable bath or solution and connected so as to form the anode terminal of a circuit supplied with current of suitable voltage to produce the desired amperage or volume of current flow per unit area of the anode. The cathode terminal, which is also immersed in the bath or solution, may be of various types and of various materials. In my application I have described carbon cathodes, and have set forth means for keeping the surface of the plate clean so that it shall be completely and uniformly exposed to the electrolytic action of the current, and for keeping the cathodes clean, and for preventing undercutting of the edges of the image or lines on the plate.

The problems to be met are different from those presented in the electro-plating art, because, in the latter, it is the deposition of metal which concerns the operator, and which must be even and regular, as well as reasonably rapid; whereas, in the present cases, it is the removal of the metal by the current into or through the solution, which must be properly regulated, and this to a much greater degree of accuracy and uniformity than is necessary in the art of deposition.

In my experimental work, which has extended over a considerable period, and in the course of which the present invention and the others hereinbefore referred to have been produced, I have found that the composition of the electrolyte plays a very considerable part, not only in the regulation of the action on the plate, but in the uniformity of such action, and in maintaining said uniformity for any appreciable period of time.

Without going into detail at this time, into the chemical reactions or the steps in transference of the metals, which take place with any particular composition, I may say generally that I have found it necessary to provide a solution which shall have, first, the proper conductivity; second, a capacity for absorbing and transferring the electrically displaced metal from the plate without soon becoming saturated or clogged; third, no tendency to foul or coat or form bubbles or spots upon the plate, which would impede the free passage of the current and thereby mar the engraving; fourth, no tendency, or a reduced tendency, to foul and form sludge upon the cathode surface in such manner that it cannot be readily removed; and fifth, such elements and such a balance of forces and properties that its efficiency will remain unimpaired for a considerable period of time, and use.

The solution which I shall hereinafter set forth, and which has for its principal active element an acetate or acetates, either alone or in combination with certain other substances, meets these conditions, and has enabled me, by actual test, to produce as good results with the last plate of a long series, as with the first one, for example the same depth of etching in the same length of time.

The present invention is correlated to and in most cases interchangeable with the inventions set forth in my companion applications executed of even date herewith and my prior applications Serial Numbers 159,776, 159,777 and 159,778, all filed April 4, 1917. The solution in the present case has for its principal active element an acetate or acetates alone or in combination with certain other substances.

The class of metals with which these electrolytes are useful is very large, including all the metals specified in my prior applications above referred to, and many others. The metals most commonly employed in the engraving art are copper, brass, steel, nickel and zinc, and the plates are employed for printing, stamping, and for other purposes. In addition to the engraving of steel printing plates both in relief and intaglio, the manufacture of steel dies and plates for stamping metals is, in itself, very important, and by my process, and with my solutions, I can produce such dies and plates in much less time, and with much less expense, than where they are cut by hand according to the practice prior to this invention. Where the plates are to be employed for printing, my invention is specially important at the present time, because of the scarcity of high grade paper, and the necessity for having perfect printing plates in order to produce satisfactory results on the cheap grade of paper now commonly employed, because of such scarcity.

Electrolytes are prepared, for the greatest efficiency and economy, for the particular metals to be etched. Wherever practicable, a combination is used in which the plate to be etched is kept clean without wiping. This is especially requisite in very delicate work, as frequent wiping would tend to injure the material of the image. In coarse work, this is relatively immaterial, and an electrolyte involving wiping of the plate may easily be used, and would be used where it is cheaper to prepare, or produces a speedier action. The cleanliness of the cathode is next preferable, as involving less labor in keeping clean, or as rendering that portion of my apparatus having movable brushes unnecessary, with a consequent saving in power used thereby. For the reasons stated, some of my formulæ do not give both a clean cathode and a clean anode.

The various use of acetates with other salts and with or without acids, is in some instances to secure anode or cathode plate cleanliness or both, and to obtain electrolytes which shall form the best chemical combinations in themselves and with the anode, shall have the longest life, and produce the smoothest etching, i e., to avoid rough grainy etching on either the sides of the lines or the bottom, and further, to secure a desirable speed which will admit of commercial etching of the various metals with practically the same electric current density. The value of this last is obvious, particularly where one dynamo or battery set is employed to supply current for the etching of different metals in separate tanks without the employment of resistance.

An acid condition is desirable in all electrolytes to give stability to the same and to increase the conductivity. If the constituent salts do not render the electrolyte acid or sufficiently acid for these purposes, an acid should be added. Some excellent electrolytes would promptly separate under electrolysis and promptly become useless were it not for the addition of the acid. Even if this does not occur the life of the electrolyte is shorter without acid and its conductivity less. Further in many cases the presence of an acid prevents precipitations in the electrolyte or on the cathode or on the anode or performs two or all of these functions.

In some combinations where the ordinary acids do not keep the cathode or the anode clean or prevent precipitations in the bath, this may in some instances be partly or wholly accomplished by the addition of a chromium salt, or by what is generally termed chromic acid (usually potassium dichromate solution acted upon by sulfuric acid), although the action herein stated does not depend on the sulfuric acid in the chromic acid as that might independently be present in or added to the electrolyte under the head of acids. The chromium salts are also employed on account of their tendency to produce a smooth surface in the anode where it is found that ordinarily the surface is rough, smoothness of the anode being usually a desirable feature.

Specifically stated, the solution to be claimed herein consists indispensably of one or more of the acetates of ammonium, barium, cadmium, calcium, chromium, cobalt, copper, iron, lead, magnesium, manganese, mercury, nickel, potassium, sodium, uranium and zinc.

While the essence of the invention is the use of a suitable acetate, I may and do employ more than one, in combination, when required, but it is obvious that only those which will properly mix or combine can be simultaneously employed.

With the acetates I may combine other salts with or without an acid. I may also employ as an additional element, a small quantity of a perchlorid, such as the perchlorid of iron, containing an excess of acid. This may be used in lieu of one or more of the foregoing acetates, and in such case, no other acid is usually necessary. The principal function of the separate acid, if added, is to increase the conductivity and prevent decrease in current density and tends in most cases to keep the face of the plate clean and to prevent disintegration of the solution.

As an example of a solution in which an acetate and an acid are employed, I may give the following:

| | |
|---|---|
| Magnesium acetate | 60 grains. |
| Water | 2 oz. |
| Muriatic acid | ¼ oz. |

As an example of an acetate, a chromium salt and an acid, I may give the following:

| | |
|---|---|
| Iron acetate saturated aqueous solution | 2 oz. |
| Chromium sulfate | 60 grains. |
| Water | 2 oz. |
| Muriatic acid C. P. | ¼ oz. |

As an example of an acetate, an oxalate and an acid, I may give the following:

| | |
|---|---|
| Sodium acetate | 120 grains. |
| Water | 2 oz. |
| Potassium oxalate | 60 grains. |
| Water | 2 oz. |
| Muriatic acid C. P. | ¼ oz. |

As an example of an acetate, a tartrate and an acid, I may give the following:

| | |
|---|---|
| Ammonium acetate | 180 grains. |
| Ammonium tartrate | 120 grains. |
| Water | 4 oz. |
| Nitric acid C. P. | ½ oz. |

As an example of an acetate, a chlorid and an acid, I may give the following:

| | |
|---|---|
| Uranium acetate saturated aqueous solution | 2 oz. |
| Sodium chlorid in water to test 20° Baumé | 2 oz. |
| Muriatic acid C. P. | ½ oz. |

As an example of an acetate, a nitrate and an acid, I may give the following:

| | |
|---|---|
| Cadmium acetate | 240 grains. |
| Ammonium nitrate | 240 grains. |
| Water | 4 oz. |
| Muriatic acid C. P. | ½ oz. |

As an example of an acetate, a borate, an oxalate and an acid, I may give the following:

| | |
|---|---|
| Ammonium acetate | 120 grains. |
| Potassium borate | 120 grains. |
| Water | 4 oz. |
| Iron oxalate saturated aqueous solution | ½ oz. |
| Muriatic acid C. P. | ⅜ oz. |

It is to be noted that in the claims where I mention an acetate, a borate, a chlorid, a sulfate, a tartrate, a nitrate or an oxalate, or a combination of any of these without mentioning a particular metal, I include in that term one or more of the salts from the same acid, that is, one or more acetates, one or more borates, etc.

Having thus described my invention what I claim and desire to secure by Letters Patent is:

1. In electrolytic etching, an anode carrying a resistant image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc.

2. In electrolytic etching, an anode carrying a resistance image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc with an acid.

3. In electrolytic etching, an anode carrying a resistant image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc with a chlorid and an acid.

4. In electrolytic etching, an anode carrying a resistant image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc with a borate, a chlorid and an acid.

5. In electrolytic etching, an anode carrying a resistant image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc with a borate, a chlorid, a sulfate and an acid.

6. In electrolytic etching, an anode carrying a resistant image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc with a borate, a chlorid, a sulfate, a tartrate and an acid.

7. In electrolytic etching, an anode carrying a resistant image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc with a borate, a chlorid, a sulfate, a tartrate, a nitrate and an acid.

8. In electrolytic etching, an anode carrying a resistant image to be etched, in combination with an electrolyte comprising one or more of the acetates of ammonium, barium, cadmium, calcium, chromium, cobalt, copper, iron, lead, magnesium, manganese, mercury, nickel, potassium, uranium or zinc with a borate, a chlorid, a sulfate, a tartrate, a nitrate, an oxalate and an acid.

9. In electrolytic etching, an anode carrying a resistant image to be etched, in combination with an electrolyte comprising one or more of the acetates of ammonium, barium, cadmium, calcium, chromium, cobalt, copper, iron, lead magnesium, manganese, mercury, nickel, potassium, uranium or zinc with a borate, a chlorid, a sulfate, a tartrate, a nitrate, an oxalate, a chromium salt other than the acetate, borate, chlorid, nitrate, sulfate or tartrate and an acid.

In testimony whereof I affix my signature.

JOSEPH H. WEEKS.